United States Patent
Agarwal

(10) Patent No.: US 11,500,539 B2
(45) Date of Patent: Nov. 15, 2022

(54) RESOURCE UTILIZATION TRACKING WITHIN STORAGE DEVICES

(71) Applicant: Western Digital Technologies, Inc., San Jose, CA (US)

(72) Inventor: Dinesh Kumar Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/181,523

(22) Filed: Feb. 22, 2021

(65) Prior Publication Data

US 2022/0121367 A1 Apr. 21, 2022

Related U.S. Application Data

(60) Provisional application No. 63/092,832, filed on Oct. 16, 2020.

(51) Int. Cl.
| | |
|---|---|
| G06F 3/06 | (2006.01) |
| G06F 9/50 | (2006.01) |
| G06F 9/455 | (2018.01) |

(52) U.S. Cl.
CPC ............ G06F 3/0605 (2013.01); G06F 3/067 (2013.01); G06F 3/0644 (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 7,543,161 B2 * 6/2009 Olszewski .......... G06F 11/3466
713/300
7,836,145 B2 * 11/2010 Taguchi .............. G06F 11/3433
709/224
(Continued)

FOREIGN PATENT DOCUMENTS

WO WO-2013089680 A1 * 6/2013 ........... G06F 3/0604

OTHER PUBLICATIONS

Y. Kang, Y. Kee, E. L. Miller and C. Park, "Enabling cost-effective data processing with smart SSD," 2013 IEEE 29th Symposium on Mass Storage Systems and Technologies (MSST), 2013, pp. 1-12, doi: 10.1109/MSST.2013.6558444. (Year: 2013).*
(Continued)

Primary Examiner — Daniel C. Chappell
(74) Attorney, Agent, or Firm — Ravi Mohan; Rutan & Tucker, LIT

(57) ABSTRACT

A resource tracking storage system can track and associate resource usage within storage devices to requesting virtual hosts. Controllers may be configured to receive commands for storage device usage sent from the requesting virtual hosts. Each command for storage device usage may result in a need for future maintenance work to be done within the storage device. Additionally, performance policies, which may be one or more set of rules, thresholds, and/or specifications that indicate a minimum (or maximum) level of performance by the storage device can be regulated by tracking and determining which hosts are degrading the performance of the storage device. With this solution, one or more performance policies can also be enforced by making sure one host is not negatively impacted from the negative storage device usage of another, errant host, even prior to the need for maintenance.

10 Claims, 9 Drawing Sheets

(52) U.S. Cl.
CPC .......... *G06F 3/0664* (2013.01); *G06F 9/5027* (2013.01); *G06F 9/45558* (2013.01); *G06F 2009/45562* (2013.01)

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–42
See application file for complete search history.

(56) References Cited

U.S. PATENT DOCUMENTS

| | | | | |
|---|---|---|---|---|
| 8,612,990 | B1 * | 12/2013 | Greenfield | G06F 3/0653 709/224 |
| 9,715,403 | B2 * | 7/2017 | van Riel | G06F 9/485 |
| 9,778,883 | B2 * | 10/2017 | Gaddis | G06F 3/0605 |
| 10,255,005 | B2 * | 4/2019 | Li | G06F 3/0689 |
| 10,282,222 | B2 * | 5/2019 | Thakkar | G06F 9/5088 |
| 10,503,558 | B2 * | 12/2019 | Rastogi | G06F 9/485 |
| 10,942,857 | B1 * | 3/2021 | Gupta | G06F 13/20 |
| 2009/0307436 | A1 * | 12/2009 | Larson | G06F 11/0745 714/49 |
| 2010/0191908 | A1 * | 7/2010 | Yamakawa | G06F 3/0653 711/170 |
| 2012/0331242 | A1 * | 12/2012 | Shaikh | G06F 16/182 711/170 |
| 2013/0047156 | A1 * | 2/2013 | Jian | G06F 9/5055 718/1 |
| 2013/0326186 | A1 * | 12/2013 | Shaikh | G06F 16/22 711/170 |
| 2014/0173223 | A1 * | 6/2014 | DeNeui | G06F 3/0683 711/154 |
| 2016/0103699 | A1 * | 4/2016 | Thakkar | G06F 9/45558 718/1 |
| 2018/0101333 | A1 * | 4/2018 | Li | G06F 3/064 |
| 2020/0004421 | A1 | 1/2020 | Yadhav et al. | |
| 2021/0149583 | A1 * | 5/2021 | Agarwal | G06F 3/0611 |
| 2021/0318830 | A1 * | 10/2021 | Jones | G06F 3/0619 |

OTHER PUBLICATIONS

On-Disk Data Processing: Issues and Future Directions; Mayank Mishra, Arun K. Somani; Sep. 8, 2017; arXiv:1709.02718; https://doi.org/10.48550/arXiv.1709.02718; retrieved from https://arxiv.org/abs/1709.02718 on Jul. 2, 2022 (Year: 2017).*

Posey, B., "Diskeeper V-locity 2: Server Virtualization Defrag", Redmond Magazine, Sep. 1, 2010, https://virtualizationreview.com/forms/emailtoauthor.aspx?AuthorItem={DE697901-5700-4C3D-B394-99FCCD4E779E}&ArticleItem={976479D0-E4C4-4F43-992C-48CAB6E27A6E}.

Shields, G., "The Essential Series: Tactics in Optimizing Virtual Machine Disk IOPS", Realtime publishers, https://statemigration.com/tactics-in-optimizing-virtual-machine-disk-iops/, screen capture Feb. 22, 2021.

* cited by examiner

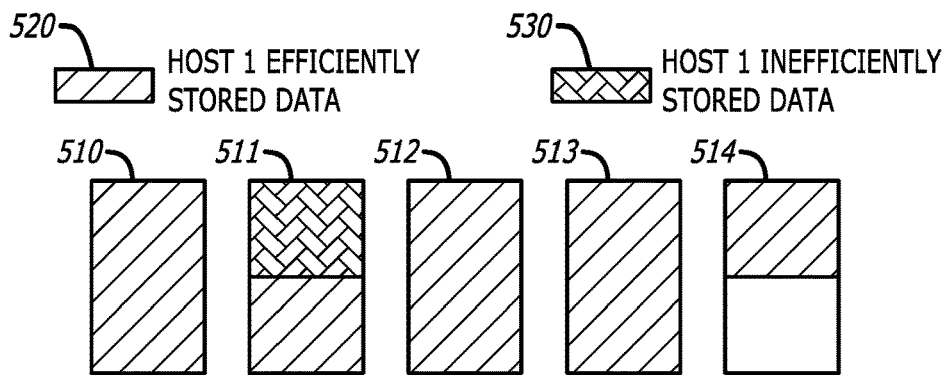
FIG. 5
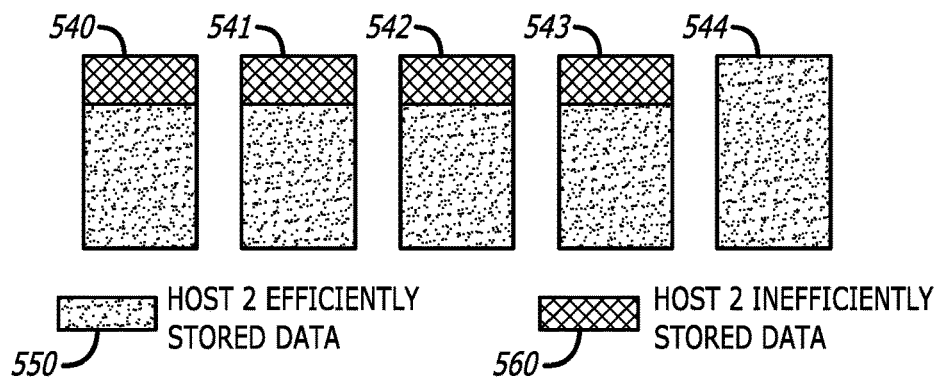
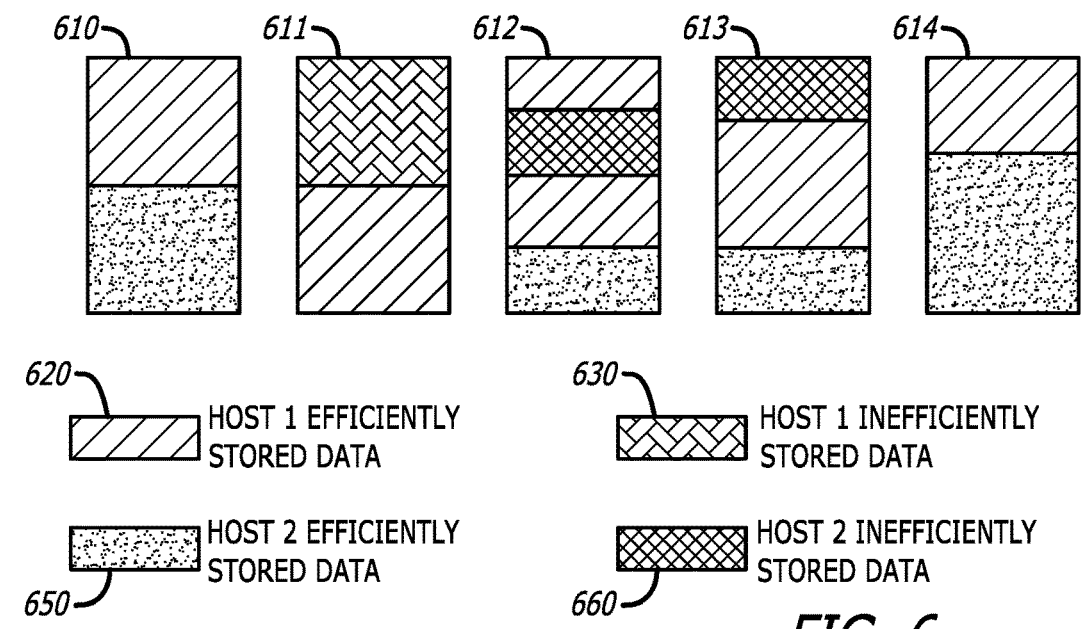
FIG. 6

RESOURCE UTILIZATION TRACKING WITHIN STORAGE DEVICES

PRIORITY

This application claims the benefit of and priority to U.S. Provisional Application No. 63/092,832, filed Oct. 16, 2020, which is incorporated in its entirety herein.

FIELD

This disclosure relates to storage devices. More particularly, the present disclosure technically relates to tracking and assigning storage device resources utilized by a plurality of virtual hosts.

BACKGROUND

Storage devices are ubiquitous within computing systems. Recently, solid-state memory devices capable of nonvolatile storage have become the predominant choice within various consumer electronics products. These storage devices can communicate and utilize various protocols including nonvolatile memory express (NVMe), and peripheral component interconnect express (PCIe) to reduce processing overhead and increase efficiency.

As processing capabilities have grown, the use of virtual machines has also increased. Virtual machines are an emulation of a computer system that is itself processed and executed as part of another computer system to provide functionality similar to that of a traditional physical computing device. It is becoming more common for various companies to utilize their available computing resources to provide virtual machines to customers as a service. Once established, a virtual machine may act as a virtual host when communicating with one or more storage devices.

It has also become increasingly more common for a storage device to be in communication with a multitude of virtual hosts. Each of these virtual hosts may be sending various commands to read and/or write data to the storage device. Each virtual host communicates to the storage device in a similar manner as if it were a dedicated storage device. The controller, software and/or logic can manage the location and ownership of any data requested and written by the virtual host.

However, as the number of virtual hosts increases, so does the variability between their storage device usage. One errant virtual host may utilize the storage device in a manner that is detrimental to the other virtual hosts. Consequently, the performance of a storage device with one virtual host using very few storage device commands may be negatively impacted in response to a second, more active virtual host. As more virtualization services are sold based on stated or promised performance, this can directly affect customers.

BRIEF DESCRIPTION OF DRAWINGS

The foregoing summary is illustrative and is not intended to be in any way limiting. In addition to the illustrative aspects, embodiments, and features described above, further aspects, embodiments, and features will become apparent by reference to the following drawings and the detailed description.

FIG. 5 is a conceptual diagram of a plurality of data blocks within a storage device and the representative use of those blocks by individual hosts in accordance with embodiments of the disclosure;

FIG. 6 is a conceptual diagram of a plurality of data blocks within a storage device and the representative use of those blocks by multiple hosts in accordance with embodiments of the disclosure;

Figure 1:
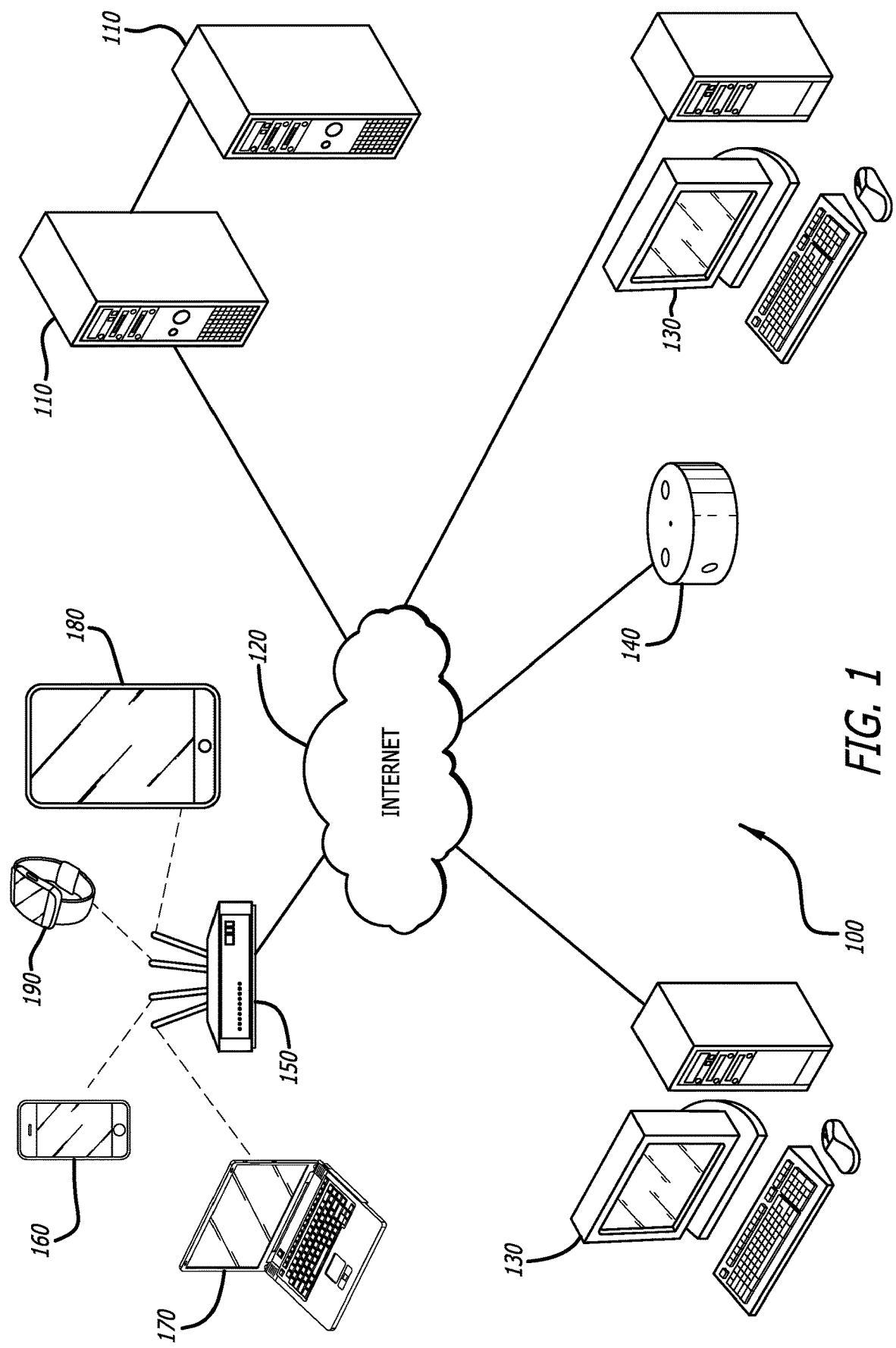
FIG. 1 is a conceptual system diagram of various devices that may generate a plurality of virtual hosts in communication with one or more storage devices utilizing resource tracking in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that describe tracking and associating resource usage within storage devices to requesting virtual hosts. As will be described in more detail below, each command for storage device usage may result in a need for future maintenance work to be done within the storage device. Additionally, performance policies, which may be one or more set of rules, thresholds, and/or specifications that indicate a minimum (or maximum) level of performance by the storage device can be regulated by tracking and determining which hosts are degrading the performance of the storage device.

For example, when presented with multiple storage device write commands, a storage device may only be able to store the data in an inefficient or fragmented state. The addition of fragmented data increases the need for a future defragment process to be executed. Operating a defragmentation process can lower the performance of the storage device while it executes. Time that would otherwise be allocated to a host may otherwise then be assigned to the defragmentation process.

Most current implementations of storage devices simply divide the time needed to execute the defragmentation process equally among all connected hosts' allocated processing time. However, this presents a problem when host storage device usage is inequitable. An errant host may send a relatively larger share of the data to be written to the storage device compared to other hosts. Thus, the need to operate the defragging process is more due to the errant host compared to the other hosts. But when the defragging process is executed, both the errant and non-errant hosts have an equal processing load.

Thus, there is a need to track the incoming storage device commands along with other available data to generate ratio data that is associated with the amount of "negative" storage device usage each host has produced and is thus "responsible for" when the subsequent maintenance work is required to be executed. In this way, each host may suffer a loss in available processing time in proportion to their contribution to the need for maintenance. With this solution, one or more performance policies can also be enforced by making sure one host isn't negatively impacted from the negative storage device usage of another, errant host, even prior to the need for maintenance.

Often, there is not relevant tracking of storage device usage within a storage device connected to multiple hosts. Some previous solutions within the art have attempted to control storage device usage by limiting, governing, or otherwise controlling the incoming flow of storage device usage commands, oftentimes at the protocol level. However, as those skilled in the art will recognize, such solutions have the unwanted result of negatively affecting response time and increasing processing resource needs.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual system diagram of various devices that may generate a plurality of virtual hosts in communication with one or more storage devices utilizing resource tracking in accordance with an embodiment of the disclosure is shown. The system 100 comprises a plurality of devices that are configured to transmit and receive data that may be stored, retrieved, and otherwise utilized within various storage devices. In many embodiments, cloud-based servers 110 are connected to a network 120 such as, for example, the Internet. Cloud-based servers 110 can be configured to transmit a variety of data across the network 120 to any number of computing devices such as, but not limited to, personal computers 130, personal listening devices 140, mobile computing devices including laptop computers 170, cellular phones 160, portable tablet computers 180 and wearable computing devices 190. Often, the cloud-based servers will provide access to one or more virtual machines or other virtualized devices which can provide one or more virtual hosts to access data stored within resource tracking storage devices. In additional embodiments, this data may be accessed in additional cloud-based service provider servers or edge network systems that utilize resource tracking storage devices. In still additional embodiments, the cloud-based servers 110 can be hosted as virtual servers within another cloud-based service which may establish one or more virtual hosts.

In further embodiments, the requests and demands for access to virtual hosts that can be provided by a cloud-based server 110 can occur over the network 120 through wired and/or wireless connections. In the embodiment depicted in FIG. 1, the mobile computing devices 160, 170, 180, 190 are connected wirelessly to the network 120 via a wireless network access point 150. It should be understood by those skilled in the art that the types of wired and/or wireless connections between devices on the system 100 can be comprised of any combination of devices and connections as needed. It is further conceived that various devices beyond the cloud-based servers 110 may utilize resource tracking storage devices and may provide virtualized hosts and/or machines based on the application desired.

Figure 2:
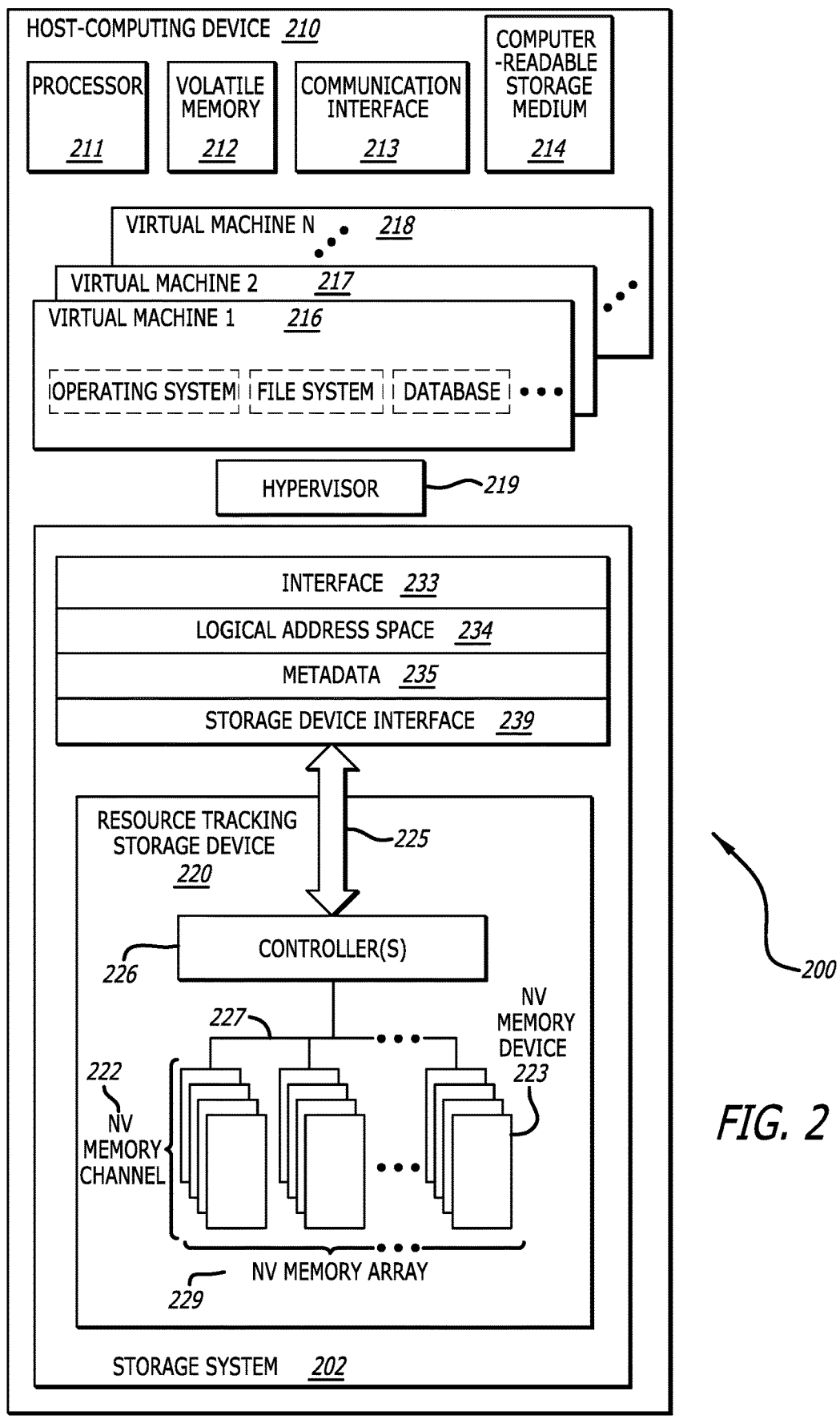
FIG. 2 is a schematic block diagram of a host-computing device with a storage device utilizing resource tracking in accordance with an embodiment of the disclosure.

Referring to FIG. 2, a schematic block diagram of a host-computing device with a storage device utilizing resource tracking in accordance with an embodiment of the disclosure is shown. The resource tracking storage device system 200 comprises one or more resource tracking storage devices 220 of a storage system 202 within a host-computing device 210 in communication via one or more controllers 226. The host-computing device 210 may include a processor 211, volatile memory 212, and a communication interface 213. The processor 211 may include one or more central processing units, one or more general-purpose processors, one or more application-specific processors, one or more virtual processors (e.g., the host-computing device 210 may itself be a virtual machine operating within a host), one or more processor cores, or the like. The communication interface 213 may include one or more network interfaces configured to communicatively couple the host-computing device 210 and/or controller(s) 226 of the resource tracking storage device 220 to a communication network, such as an Internet Protocol (IP) network, a Storage Area Network (SAN), wireless network, wired network, or the like.

The resource tracking storage device 220, in various embodiments, may be disposed in one or more different locations relative to the host-computing device 210. In one embodiment, the resource tracking storage device 220 comprises one or more non-volatile memory devices 223, such as semiconductor chips or packages or other integrated circuit devices disposed on one or more printed circuit boards, storage housings, and/or other mechanical and/or electrical support structures. For example, the resource tracking storage device 220 may comprise one or more direct inline memory module (DIMM) cards, one or more expansion cards and/or daughter cards, a solid-state-drive (SSD) or other hard drive device, and/or may have another memory and/or storage form factor. The resource tracking storage device 220 may be integrated with and/or mounted on a motherboard of the host-computing device 210, installed in a port and/or slot of the host-computing device 210, installed on a different host-computing device 210 and/or a dedicated storage appliance on the network, in communication with the host-computing device 210 over an external bus (e.g., an external hard drive), or the like.

The resource tracking storage device 220, in one embodiment, may be disposed on a memory bus of a processor 211 (e.g., on the same memory bus as the volatile memory 212, on a different memory bus from the volatile memory 212, in place of the volatile memory 212, or the like). In a further embodiment, the resource tracking storage device 220 may be disposed on a peripheral bus of the host-computing device 210, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the resource tracking storage device 220 may be disposed on a data network, such as an Ethernet network, an Infiniband network, SCSI RDMA over a network, a storage area network (SAN), a local area network (LAN), a wide area network (WAN) such as the Internet, another wired and/or wireless network, or the like.

The host-computing device 210 may further comprise a computer-readable storage medium 214. The computer-readable storage medium 214 may comprise executable instructions configured to cause the host-computing device 210 (e.g., processor 211) to perform steps of one or more of the methods disclosed herein. Additionally, or in the alternative, the resource tracking logic 334 (FIG. 3) may be embodied as one or more computer-readable instructions stored on the computer-readable storage medium 214.

The host-computing device can include a plurality of virtual machines 216, 217, 218 which may be instantiated or otherwise created based on user-request. As will be understood by those skilled in the art, a host-computing device may create a plurality of virtual machines configured as virtual hosts which is limited only on the available computing resources and/or demand. A hypervisor 219 can be available to create, run, and otherwise manage the plurality of virtual machines 216, 217, 218. Each virtual machine 216, 217, 218 may include a plurality of virtual host clients that may utilize the storage system 202 to store and access data. That data may be accessed via a variety of methods.

A device driver and/or the controller(s) 226, in certain embodiments, may present a logical address space 234 to the virtual machines 216, 217, 218. As used herein, a logical address space 234 refers to a logical representation of memory resources. The logical address space 234 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the resource tracking storage device 220 may maintain metadata 235, such as a logical to physical address mapping structure, to map logical addresses of the logical address space 234 to media storage locations on the resource tracking storage device(s) 220. A device driver may be configured to provide storage services to one or more virtual machines 216, 217, 218 or their respective virtual host clients. The virtual machines 216, 217, 218 may include local clients operating on the host-computing device 210 and/or remote host clients accessible via the network and/or communication interface 213. The local clients within virtual machines 216, 217, 218 may include, but are not limited to: operating systems, file systems, database applications, server applications, kernel-level processes, user-level processes, applications, and the like.

The device driver may be further communicatively coupled to one or more storage systems 202 which may include different types and configurations of resource tracking storage devices 220 including, but not limited to: solid-state storage devices, semiconductor storage devices, SAN storage resources, or the like. The one or more resource tracking storage devices 220 may comprise one or more respective controllers 226 and non-volatile memory channels 222. The device driver may provide access to the one or more resource tracking storage devices 220 via any compatible protocols or interface 233 such as, but not limited to, SATA and PCIe, although PCIe is currently more suitable. The metadata 235 may be used to manage and/or track data operations performed through the protocols or interfaces 233. The logical address space 234 may comprise a plurality of logical addresses, each corresponding to respective media locations of the one or more resource tracking storage devices 220. The device driver may maintain metadata 235 comprising any-to-any mappings between logical addresses and media locations.

A device driver may further comprise and/or be in communication with a storage device interface 239 configured to transfer data, commands, and/or queries to the one or more resource tracking storage devices 220 over a bus 225, which may include, but is not limited to: a memory bus of a processor 211, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network, Infiniband, SCSI RDMA, or the like. The storage device interface 239 may communicate with the one or more resource tracking storage devices 220 using input-output control (IO-CTL) command(s), IO-CTL command extension(s), remote direct memory access, or the like.

The communication interface 213 may comprise one or more network interfaces configured to communicatively couple the host-computing device 210 and/or the controller(s) 226 to a network and/or to one or more remote host clients. The controller(s) 226 are part of and/or in communication with one or more resource tracking storage devices 220. Although FIG. 2 depicts a single resource tracking storage device 220, the disclosure is not limited in this regard and could be adapted to incorporate any number of resource tracking storage devices 220.

The resource tracking storage device 220 may comprise one or more non-volatile memory devices 223 of non-volatile memory channels 222, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide- Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 223 of the non-volatile memory channels 222, in certain embodiments, comprise storage class memory (SCM) (e.g., write in place memory, or the like).

While the non-volatile memory channels 222 may be referred to herein as "memory media," in various embodiments, the non-volatile memory channels 222 may more generally comprise one or more non-volatile recording media capable of recording data, which may be referred to as a non-volatile memory medium, a non-volatile storage medium, or the like. Further, the resource tracking storage device 220, in various embodiments, may comprise a non-volatile recording device, a non-volatile memory array, a plurality of interconnected storage devices in an array, or the like.

The non-volatile memory channels 222 may comprise one or more non-volatile memory devices 223, which may include, but are not limited to: chips, packages, planes, die, or the like. One or more controller(s) 226 may be configured to manage data operations on the non-volatile memory channels 222, and may comprise one or more processors, programmable processors (e.g., FPGAs), ASICs, microcontrollers, or the like. In some embodiments, the controller(s) 226 are configured to store data on and/or read data from the non-volatile memory channels 222, to transfer data to/from the resource tracking storage device 220, and so on.

The controller(s) 226 may be communicatively coupled to the non-volatile memory channels 222 by way of a bus 227. The bus 227 may comprise an I/O bus for communicating data to/from the non-volatile memory devices 223. The bus 227 may further comprise a control bus for communicating addressing and other command and control information to the non-volatile memory devices 223. In some embodiments, the bus 227 may communicatively couple the non-volatile memory devices 223 to the controller 226 in parallel. This parallel access may allow the non-volatile memory devices 223 to be managed as a group, forming a non-volatile memory array 229. The non-volatile memory devices 223 may be partitioned into respective logical memory units (e.g., logical pages) and/or logical memory divisions (e.g., logical blocks). The logical memory units may be formed by logically combining physical memory units of each of the non-volatile memory devices 223.

The controller(s) 226 may organize or partition the non-volatile memory array 229 into various virtual drives. In many embodiments, a partitioned virtual drive may be presented to a host-computing device (and/or virtual host) as a separate physical drive. In further embodiments, the resource tracking storage device 220 may assign one controller 226 to each partition within the non-volatile memory array 229. In this way, the host-computing device 210 would behave as if multiple physical drives were communicatively coupled instead of the sole physical resource tracking storage device 220 actually coupled. Thus, the host-computing device 210 may pair each of the "virtual drives" with a "virtual machine." As a result, the virtual machines 216, 217, 218 may communicate and operate with the virtual drives as if they each had their own storage device. As will be described in further detail below, the host-computing device may send metadata to the resource tracking storage device 220 that can that may allow for tracking of usage between each of these partitions. In a number of embodiments, the requests from the host-computing device 210 are made directly to the configurable performance controller within the resource tracking storage device 220 associated with the virtual drive. These configurable performance controllers may be physically separate controllers within the variable performance storage device or may be virtualized controllers within a single controller 226.

The controller(s) 226 may comprise and/or be in communication with a device driver executing on the host-computing device 210. A device driver may provide storage services to the virtual machines 216, 217, 218 via one or more interfaces 233. A device driver may further comprise a storage device interface 239 that is configured to transfer data, commands, and/or queries to the controller 226 over a bus 225, as described above.

Figure 3:
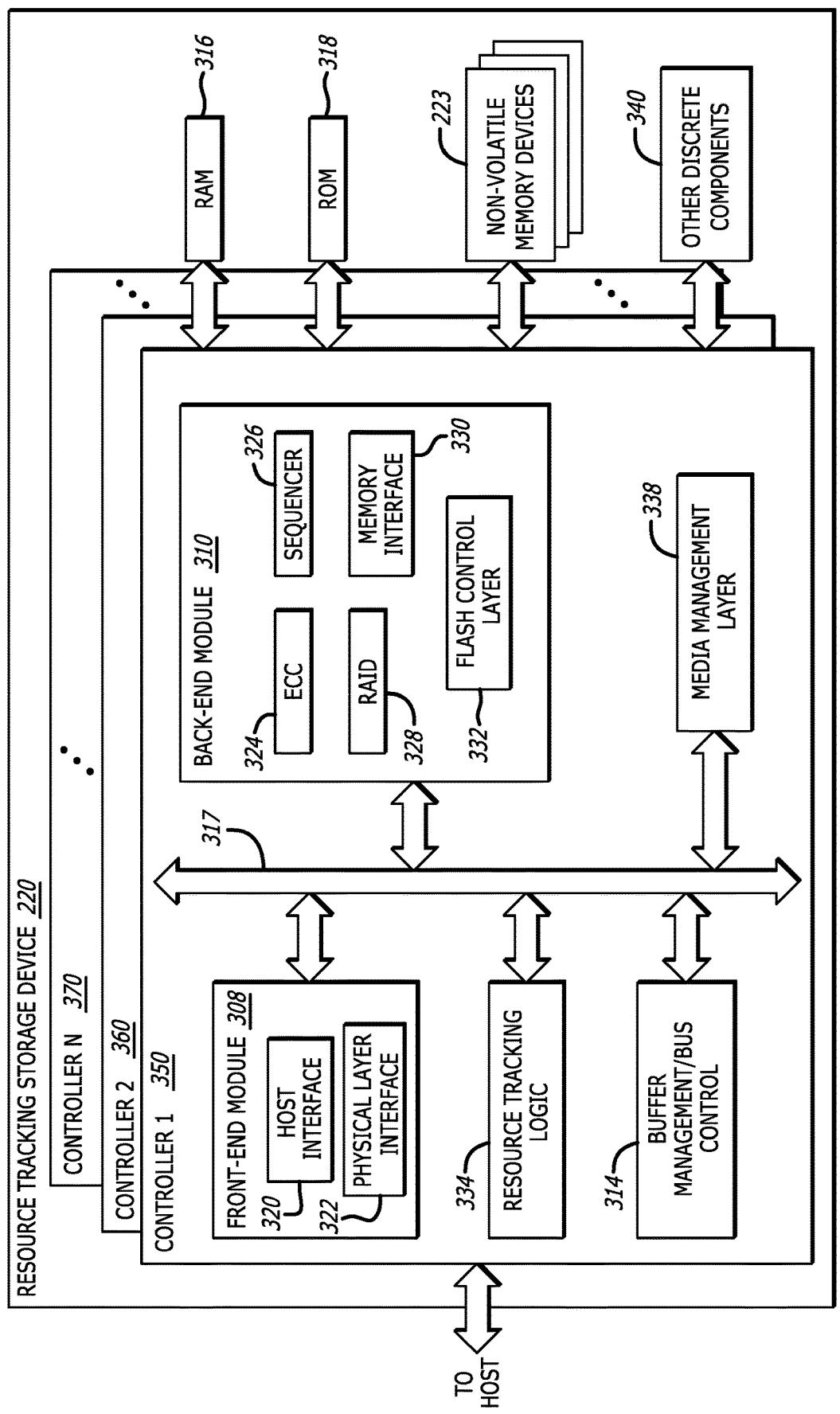
FIG. 3 is a schematic block diagram of a storage device utilizing resource tracking in accordance with an embodiment of the disclosure.

Referring to FIG. 3, a schematic block diagram of a storage device utilizing resource tracking in accordance with an embodiment of the disclosure is shown. The resource tracking storage device 220 can include any number of physical or virtual controllers 350, 360, 370. Each controller 350, 360, 370 may include a front-end module 308 that interfaces with a host (such as the host-computing system 210 of FIG. 2), a back-end module 310 that interfaces with the non-volatile memory devices 223, and various other modules that perform various functions of the resource tracking storage device 220. In some embodiments, each logic or module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller(s) 350, 360, 370 may include a buffer management/bus control module 314 that manages buffers in random access memory (RAM) 316 and controls the internal bus arbitration for communication on an internal communications bus 317 of the controller 126. A read only memory (ROM) 318 may store and/or access system boot code. Although illustrated in FIG. 3 as located separately from the controller(s) 350, 360, 370, in other embodiments one or both of the RAM 316 and the ROM 318 may be located within each controller 350, 360, 370. In yet other embodiments, portions of RAM 316 and ROM 318 may be located both within the controller(s) 350, 360, 370 and outside the controller(s) 350, 360, 370. Further, in some implementations, the controller(s) 350, 360, 370, the RAM 316, and the ROM 318 may be located on separate semiconductor dies.

In various embodiments, one or more submission queues and one or more completion queues may be stored in a controller memory buffer, which may be housed in RAM 316. As will be understood by those skilled in the art, submission queues allow data to be stacked for transfer into storage devices for processing while completion queues stack the retrieved data associated with the processed request obtained from the submission queue. Typically, submission queues and completion queues within a storage device are static, may be divided equally, or at a fixed rate when partitioning a memory array for use by multiple controllers as virtual drives.

Additionally, the front-end module 308 may include a host interface 320 and a physical layer interface 322 that provides the electrical interface with the host or next level storage controller. The choice of the type of the host interface 320 can depend on the type of memory being used. Examples types of the host interfaces 320 may include, but are not limited to, SATA, SATA Express, SAS, Fibre Channel, USB, PCIe, and NVMe although the preferred method is currently NVMe. The host interface 320 may typically facilitate transfer for data, control signals, and timing signals.

The back-end module 310 may include an error correction controller (ECC) engine 324 that encodes the data bytes received from the host and decodes and error corrects the data bytes read from the non-volatile memory devices 223. The back-end module 310 may also include a command sequencer 326 that generates command sequences, such as program, read, and erase command sequences, to be transmitted to the non-volatile memory devices 223. Additionally, the back-end module 310 may include a RAID (Redundant Array of Independent Drives) module 328 that manages generation of RAID parity and recovery of failed data. The RAID parity may be used as an additional level of integrity protection for the data being written into the resource tracking storage device 220. In some cases, the RAID module 328 may be a part of the ECC engine 324. A memory interface 330 can provide command sequences or requests to the non-volatile memory devices 223 and can receive status information from the non-volatile memory devices 223. Along with the command sequences and status information, data to be programmed into and read from the non-volatile memory devices 223 may be communicated through the memory interface 330. A flash control layer 332 may control the overall operation of back-end module 310.

Additional modules of the resource tracking storage device 220 illustrated in FIG. 3 may include a media management layer 338, which performs wear leveling of memory cells of the non-volatile memory devices 223. The resource tracking storage device 220 may also include other discrete components 340, such as external electrical interfaces, external RAM, resistors, capacitors, or other components that may interface with controller(s) 350, 360, 370. In alternative embodiments, one or more of the RAID modules 328, media management layer 338 and buffer management/bus control 314 are optional components that may not be necessary in the controller(s) 350, 360, 370.

Finally, the controller(s) 350, 360, 370 may also comprise a resource tracking logic 334 that can be configured to track, associate, and manage the incoming host commands being sent by one of a plurality of connected hosts. In various embodiments, incoming commands may be tracked by the resource tracking logic 334 and stored within RAM 316, ROM 318, and/or a non-volatile memory device 223. This tracked data may then be processed to determine ratio data that can be associated with an amount each one of a plurality of connected hosts is responsible for activity within the resource tracking storage device 220.

In response, the resource tracking logic 334 can direct one or more controllers 350, 360, 370 to equitably divide any processing tasks between the connected hosts based on their contribution to the need for processing. In a variety of embodiments, this can be done by tracking which hosts have provided efficient and inefficient data to be stored, as well as which hosts have erased efficient and inefficient data from the non-volatile memory devices 223. Finally, resource tracking logic 334 may also store or have access to a performance policy associated with one or more of the connected hosts, which may be monitored and enforced through distribution of background processing tasks.

Figure 4:
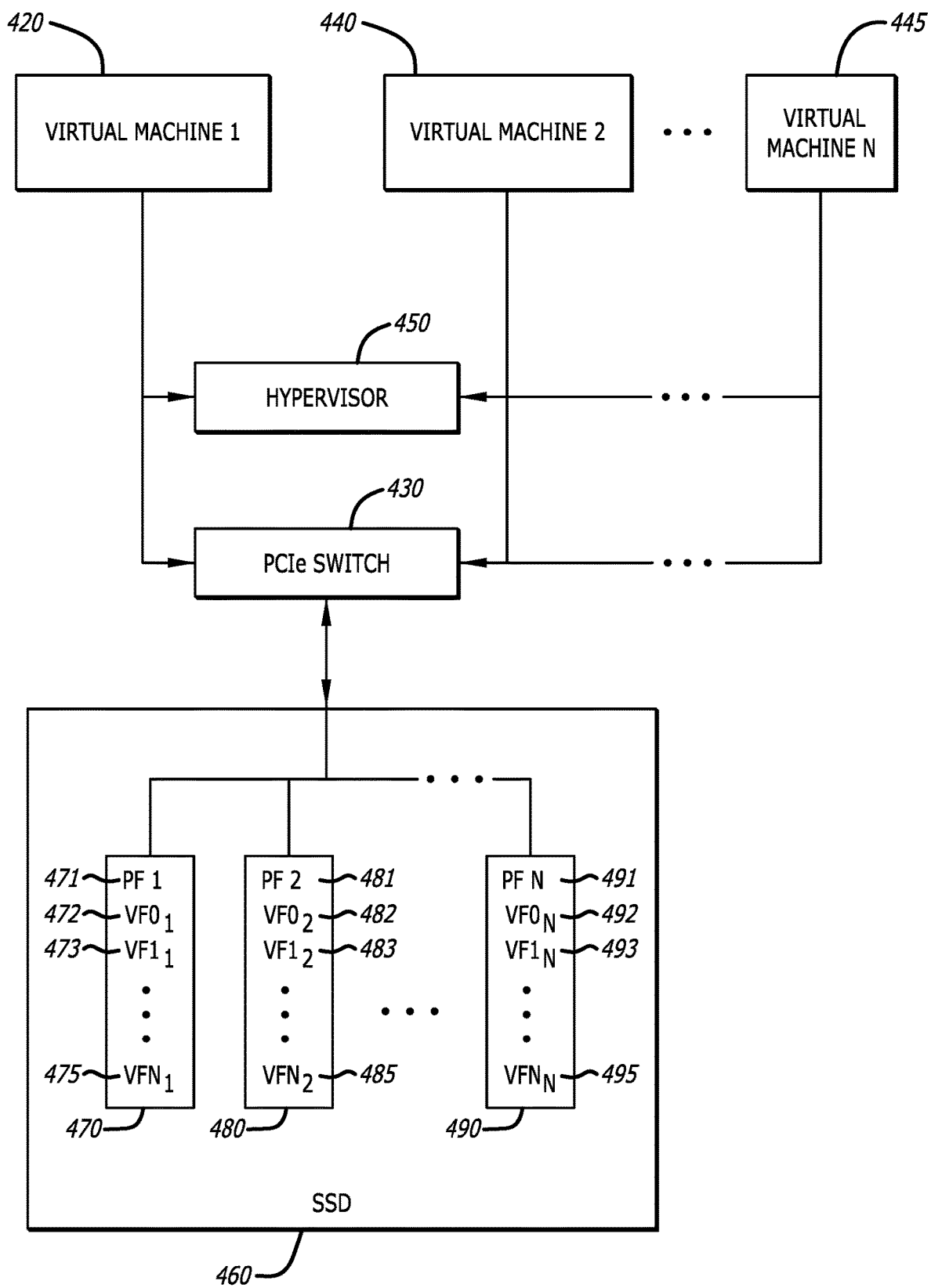
FIG. 4 is a conceptual block diagram depicting a single storage device utilizing resource tracking communicating with a plurality of virtual hosts via virtualized controllers in accordance with an embodiment of the disclosure.

Referring to FIG. 4, a conceptual block diagram depicting a single storage device utilizing resource tracking communicating with a plurality of virtual hosts via virtualized controllers 470, 480, 490 in accordance with an embodiment of the disclosure is shown. Various conceptualized embodiments of the disclosure have been described above. FIG. 4 depicts a more specified embodiment that utilizes a standards and protocols including PCIe, NVMe, and (in some embodiments) single root input/output virtualization (SR-IOV). The SSD 460 can be communicatively coupled to a PCIe switch 430 which is itself communicatively coupled with a plurality of virtual machines 420, 440, 445 each operating one or more virtual hosts. In many traditional embodiments, the virtual machines 420, 440, 445 are in communication and managed by a hypervisor 450, while in embodiments utilizing SR-IOV, the communication lines between the virtual machines 420, 440, 445 and the SSD 460 bypasses the hypervisor 450 and are handled by the PCIe switch 430. In these SR-IOV embodiments, the hypervisor 450 has fewer demands related to data input and output on its available resources.

The controller within the SSD 460 may, in response to establishing connections with virtual machines 420, 440, 445 and their respective virtual hosts may generate virtual controllers which are configured to operate and "control" a particular portion of the memory array within the SSD 460. The SSD 460 can be configured for and/or communicate via the NVMe protocol. Within the SSD 460, a series of one or more physical functions (PF) 471, 481, 491 are present which can correspond to a physical drive, portion of the memory array, or other physical partition. Each physical function 471, 481, 491 can have a plurality of respective virtual functions 472-475, 482-485, 492-495 that can act as virtualized controllers. Depending on the computing resources available, the virtual functions 472-475, 482-485, 492-495 can have a reduced set of commands available, meaning that they can only respond to a limited set of commands. These limited commands may be configured to be at least one or more vendor specific commands that provide access to request or allow for the tracking of metadata associated with any storage device commands sent by any of a plurality of hosts.

In many embodiments, each virtual function 472-475, 482-485, 492-495 can be assigned unique NVMe controller registers. In further embodiments, the virtual functions 472-475, 482-485, 492-495 will share the same PCIe configurations as their corresponding physical functions 471, 481, 491. By way of example and not illustration, virtual machine 1 420 can comprise a virtual host that has a low level of storage device utilization, while virtual machine 2 440 has a very high and demanding list of storage device commands.

Referring to FIG. 5, a conceptual diagram of a plurality of data blocks 510-514, 540-544 within a storage device and the representative use of those data blocks 510-514, 540-544 by individual hosts in accordance with embodiments of the disclosure is shown. As discussed above, virtual hosts may have access to store data within one or more blocks of a storage device. In many embodiments, each block may be assigned or utilized by a single host.

Based on the storage usage required by a host, data may be stored in various ways. For example, data may be stored in continuous and/or sequential areas that allow for efficient usage and faster read backs. In some embodiments, data may be considered efficiently stored due to additional factors such as internal data movements, or other physical device related parameters which can impact storage efficiency. Conversely, data can be stored inefficiently by breaking the data into smaller and/or discontinuous areas which can create unused gaps within the storage blocks. In various embodiments, data stored within blocks may be classified by one or more metrics as either efficiently stored data or inefficiently stored data. For example, a file may be stored with a plurality of versions, and when a new version has been generated or approved, previous versions of that file may subsequently be deemed invalid and thus be inefficiently stored data which leads to fragmentation within the memory array.

The illustrative embodiment depicted in FIG. 5 shows two groups of data blocks 510-514, 540-544 which can be grouped as upper data blocks 510-514, and lower data blocks 540-544. The upper data blocks 510-514 are being utilized solely by a first host (described as "Host 1") while the lower data blocks 540-544 are being utilized solely by a second host (described as "Host 2"). The first and second hosts both store data efficiently and inefficiently based on one or more preconfigured standards and/or metrics. The first, third, and fourth data blocks 510, 512, 513 have efficiently stored data 520 from the first host throughout. The second data block 511 has approximately half of its storage utilized by the first host to store efficiently stored data 520 and inefficiently stored data 530. The last data block 514 has half of its capacity utilized by efficiently stored data 520 from the first host, while the second half of the last data block 514 is empty (i.e. "storing no claimed data").

The lower set of data blocks 540-544 include a last data block 544 which is shown being fully utilized by the second host to store efficiently stored data 550. The remainder of the data blocks 540-543 all have approximately one quarter of available space utilized for storing inefficiently stored data 560 from the second host, while the remainder of the storage blocks 510-513 are utilized by the second host to store efficiently stored data 550. The lower set of blocks 540-544 have no empty (i.e., "unclaimed") data storage areas.

As can be seen from the example shown in FIG. 5, the storage device can easily track which host is creating each inefficiently area of data block usage. This can be accomplished by associating inefficient space within a particular data block with the respective host that "owns" or otherwise has exclusive access to the data block. In this way, one method of calculating the proper allocation of future processing and/or maintenance work between the hosts is to simply add up each inefficient space and/or writing command and compare each host's totals with the other available hosts.

So, in the example embodiment depicted in FIG. 5, data may be generated that indicates that the first host has approximately half of one block written with inefficiently stored data 530. Conversely, the second host may be determined to have contributed approximately one entire block worth of inefficiently stored data 560. Thus, in certain embodiments, in response to a request or need for storage device maintenance to occur, the processing cycles allotted or requested by the second host may be more often redistributed to one or more maintenance tasks compared to the first host.

It should be understood that the example above is illustrative only and that various embodiments within the disclosure may include more and/or increasingly complex classifications of data. Additionally, data blocks may have more than two hosts communicating with the storage device and can be increased up until other constraining factors such as computer resources and/or physical connections make further host connections unfeasible. Finally, while the data blocks 510-514, 540-544 are shown in FIG. 5, it will be recognized by those skilled in the art that other storage device structures may be utilized such as memory devices, channels, etc.

Referring to FIG. 6, a conceptual diagram of a plurality of data blocks 610-614 within a storage device and the representative use of those data blocks 610-614 by multiple hosts in accordance with embodiments of the disclosure is shown. Similar to the data blocks depicted in FIG. 5, the embodiment shown in FIG. 6 comprises a plurality of data blocks 610-614. However, these data blocks 610-614 are each being utilized by multiple hosts. Therefore, the storage device cannot simply track, sum, and/or associate inefficiently stored data with a specific host as each host may have been responsible for the data stored within the data block 610-614.

As depicted in the embodiment of FIG. 6, the first data block 610 is utilized by both the first and second host. Approximately half of the first data block 610 comprises efficiently stored data 620 from the first host while the other half comprises efficiently stored data 650 from the second host. Similarly, about one-third of the last data block 614 comprises efficiently stored data 620 from the first host with the remaining two-thirds being efficiently stored data 650 from the second host. About three-quarters of the second data block 611 comprises inefficiently stored data from the first host 630 while the remainder is efficiently stored data 620. Finally, the third and fourth data blocks 612, 613 are approximately halfway utilized by efficiently stored data 620 from the first host with the remaining two quarters about evenly split between efficiently stored data 650 and inefficiently stored data 660 from the second host.

In the embodiment depicted in FIG. 6, the storage device cannot simply analyze the inefficient storage usage per data block and assign it to a particular host as multiple hosts are utilizing the same data block. In embodiments with multiple host usage per data block, various methods may be used to properly assign data block usage to hosts. In many embodiments, the storage device may simply analyze each storage device usage command as they are being sent to the storage device. In these embodiments, the storage device may log each storage device usage request along with other relevant data including the amounts, number, timings, and/or types of storage device usage (e.g., reads or writes).

Once an understanding of data block usage is required, the storage device may operate a function or other process to input the available data which can then generate ratio data that can be utilized to assign one or more tasks and/or processing cycles equitably among the various hosts. For example, a host that is responsible for seventy-five percent of inefficient data block usage can be allocated seventy-five percent of the required processing cycles or tasks needed to properly maintain the storage device. In this way, each host is equitably assigned tasks based on their actual usage of the storage device.

In further embodiments, the generation of ratio data may also examine the number of data block access and/or the amount of time the storage device was accessed by each host. Thus, a host that is constantly accessing the storage device may cause a lowering of overall performance that can affect the performance of one or more other hosts in communication with the storage device. In these embodiments, ratio data may be configured to reflect the overall number of requests made to the storage device. In additional embodiments, the ratio data may be configured to reflect the amount of time (e.g., a time window) wherein the storage device was utilized by each host. By doing so, a host that had a previous history of elevated requests is not assigned a higher ratio score after a preconfigured amount of time.

In still more embodiments, each storage device request sent by a host may include particular metadata that can be tracked by the storage device and utilized to generate ratio data when required. Instead of requiring the storage device (or storage device controller) to expend processing resources generating the log data for ratio data generation use, the host request may simply include metadata that can be formatted to be directly stored within a data log with little to no further processing, parsing, or other formatting needed. By utilizing command metadata, the storage device can operate more efficiently which may lead to an overall increase in performance compared to analyzing each overall storage device command.

The logged data may be stored within an available memory device, RAM, or ROM within the storage device. In some embodiments, the logged data is simply a log table that can be created, appended, or modified as needed. It should be understood by those skilled in the art that logged data and the generation of ratio data can be accomplished within the storage device by either software or hardware-based means. In some embodiments, the processing of ratio data may be offloaded to one or more hosts and/or to another processing device available via a network connection.

Figure 7:
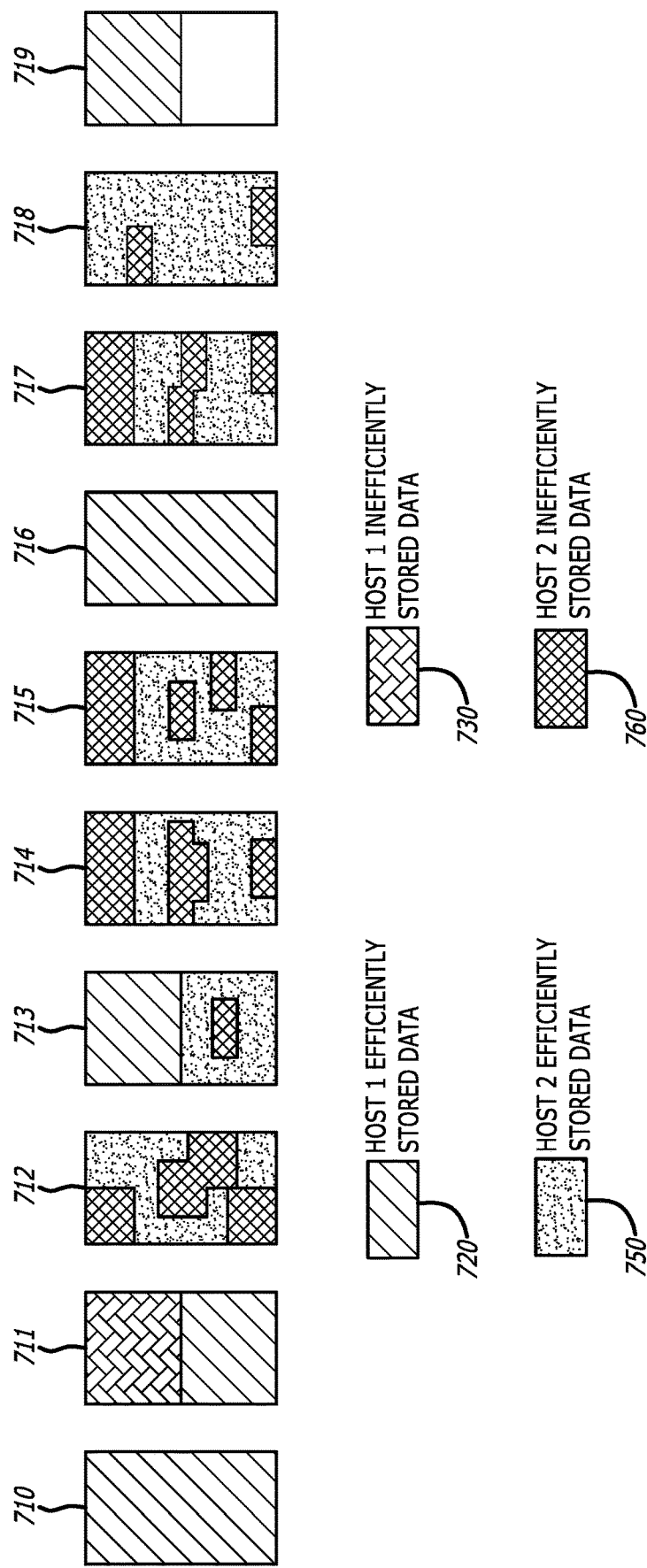
FIG. 7 is a conceptual diagram of a plurality of data blocks within a storage device and the representative non-continuous use of those blocks by multiple hosts in accordance with embodiments of the disclosure.

Referring to FIG. 7, a conceptual diagram of a plurality of data blocks 710-719 within a storage device and the representative non-continuous use of those data blocks 710-719 by multiple hosts in accordance with embodiments of the disclosure is shown. Similar to the data blocks shown in FIGS. 5-6, the group of data blocks 710-719 are conceptually shown to be utilized by multiple hosts. While the previous figures showed uniform data block usage, the data blocks 710-719 of FIG. 7 better illustrate embodiments where a more complex interweaving of stored data may occur. As will be understood by those skilled in the art, actual memory arrays, channels, memory devices, etc. can have even more complicated patterns as the number of hosts increase and the size of the stored data decreases.

The data blocks 710-719 include various states of exemplary data storage. For example, the first block 710 and seventh block 716 fully comprise efficiently stored data 720 from a first host (described as "Host 1") while the last block 719 is half comprised of efficiently stored data 720 from the first host with the remaining available storage space being unclaimed (i.e., empty). Data blocks such as the third through sixth and eighth and ninth data block 712-715, 717-718 can be partially comprised of inefficiently stored data 760 from the second host (described as "Host 2") which is interleaved within efficiently stored data 750 from the second host. Only the second data block 711 comprises inefficiently stored data 730 from the first host.

As discussed above, increasingly complex data storage patterns can in certain embodiments decrease the overall performance of the storage device. This may impact one or more hosts who may be subject to one or more performance policies. A performance policy can be understood as a particular set of thresholds, standards, and/or other promised levels of service that should be provided to a host. Often, a plurality of hosts are connected to a storage device in a cloud-computing based system. Access to the storage device may be sold to an end user with a particular level of promised service such as a minimum data storage input and/or output throughput, a particular response time, and/or a minimum level of standard operation (i.e., uptime). Thus, for hosts that are subject to one or more performance policies, resource tracking storage devices can be configured to account for and maintain these performance policies by properly tracking and assigning tasks to hosts that are either responsible for the needed processing, or to lower priority hosts that are not subject to a performance policy or who would otherwise not be negatively impacted by lowering the overall priority (e.g., a host that is asleep or otherwise inactive).

For example, an overall evaluation of the embodiment depicted in FIG. 7 shows that the second host is more responsible for the defragmentation of the data blocks 710-719. When a defragmentation process is required to be executed, the second host will have a larger associated ratio and will subsequently be assigned an increased share of the processing cycles and/or time needed to defragment the data blocks 710-719. Alternatively, the first host may be subject to a performance policy. Thus, when repeated requests to write inefficiently stored data 760 to the data blocks 710-719 are made, the storage device may reduce the performance of responding to those requests in order to maintain the performance necessary for the first host to comply with the performance policy.

Performance policy data may be received upon connection with each particular host. In absence of host performance policy metadata, the storage device may, in some embodiments, be configured at a global level to enforce an overall global performance policy that may be configured to affect all connected hosts. These global performance policy settings may be enforced by analyzing which hosts are most negatively affecting performance and then throttling or otherwise lowering their priority until the global performance has been restored to acceptable levels.

Figure 8:
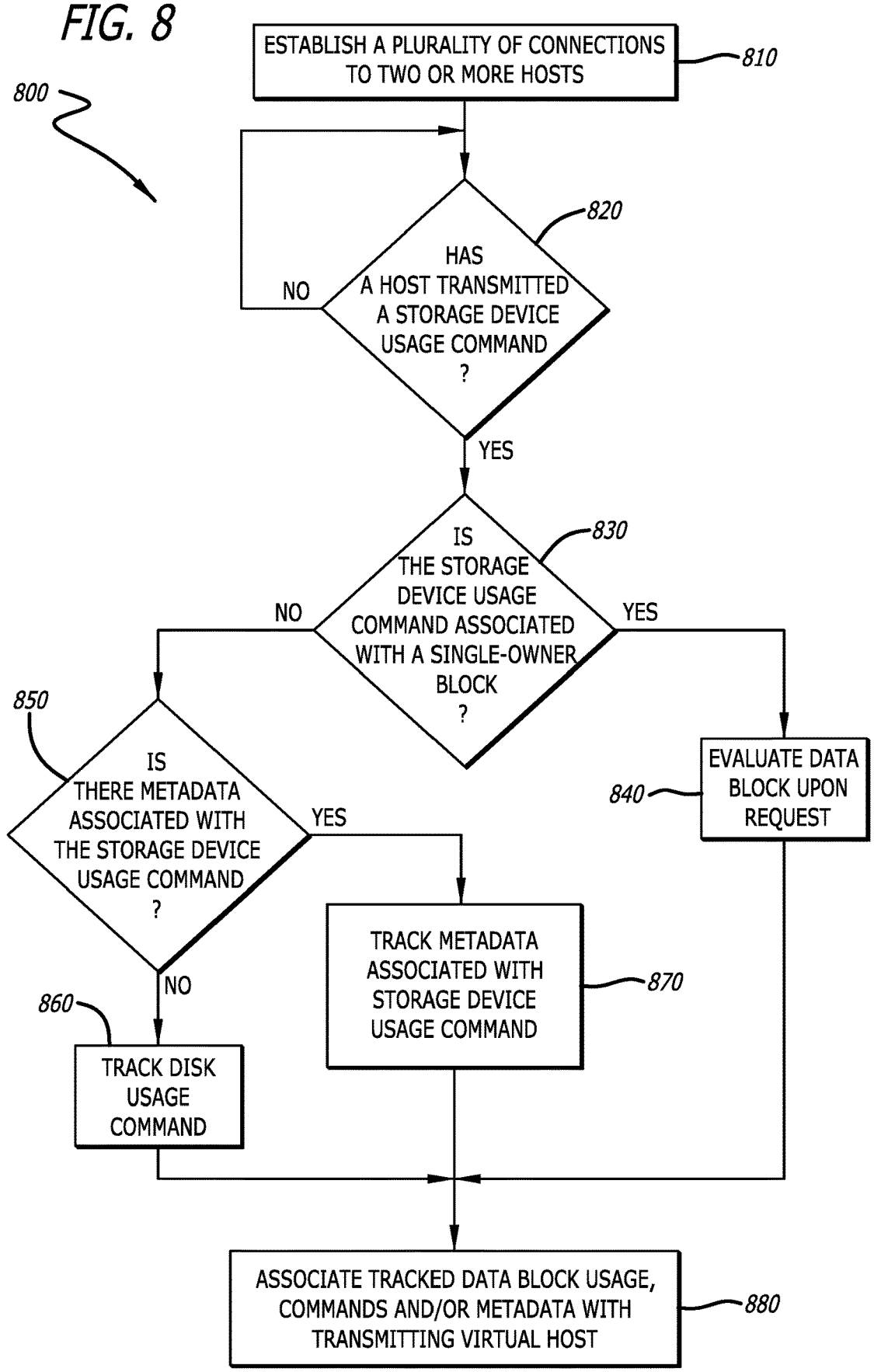
FIG. 8 is a flowchart depicting a process for tracking resources requested by a plurality of hosts in accordance with an embodiment of the disclosure.

Referring to FIG. 8, a flowchart depicting a process 800 for tracking resources requested by a plurality of hosts in accordance with an embodiment of the disclosure is shown. The process 800 can establish a plurality of connections between the storage device and two or more hosts (block 810). In many embodiments, the number of connections can be limited only by the available physical connections and/or computing resources. Often, the connections to the hosts are to a plurality of virtual hosts such that a storage device is within (or is otherwise in communication with) a first host device which can then instantiate one or more virtual machines that may generate a plurality of virtual hosts that can establish communications with a storage device.

During operation, the host can transmit one or more storage device usage commands to the storage device (block 820). The process 800 will wait until one or more storage device usage commands has been sent. Once received, the storage device can determine if the data block being utilized by the storage device usage command is associated with a single host (block 830). As discussed above, when a single host is associated with a data block (or memory device, channel, etc.), the process 800 can avoid immediate tracking and can defer analysis of data block use until a request has been made to do so (block 840). Once that request has been received, the process 800 can then fully analyze each data block with a single owner and properly utilize that data to process and generate ratio data to associate to each host (block 880).

If a data block has multiple hosts utilizing it, the process 800 can determine if the storage device usage command comprises metadata (block 850). As previously discussed, metadata may be embedded or otherwise transmitted to a storage device with each usage command sent from the host. When metadata is available, the process 800 can track the metadata associated with the storage device usage command (block 870). The tracked (i.e., logged, stored) metadata can subsequently be used when generating ratio data to associate storage device usage to each host (block 880).

When no metadata is available within the received storage device usage commands, the process 800 can instead track the usage command itself (block 860). As discussed above, the usage command may be parsed to generate separate pieces of data such as, but not limited to, data size, efficient or inefficient storage, time requested, time completed, number of requests within a rolling window, etc. that may later be used for associating storage device usage to each host (block 880). In a number of embodiments, the association of storage device usage with each host may require processing multiple types of data including overall single-owner block usage, storage device usage commands, parsed command data, and/or tracked metadata. In these embodiments, the generation of ratio data may require processing multiple types of data which may require further weighting and or summing processes.

Figure 9:
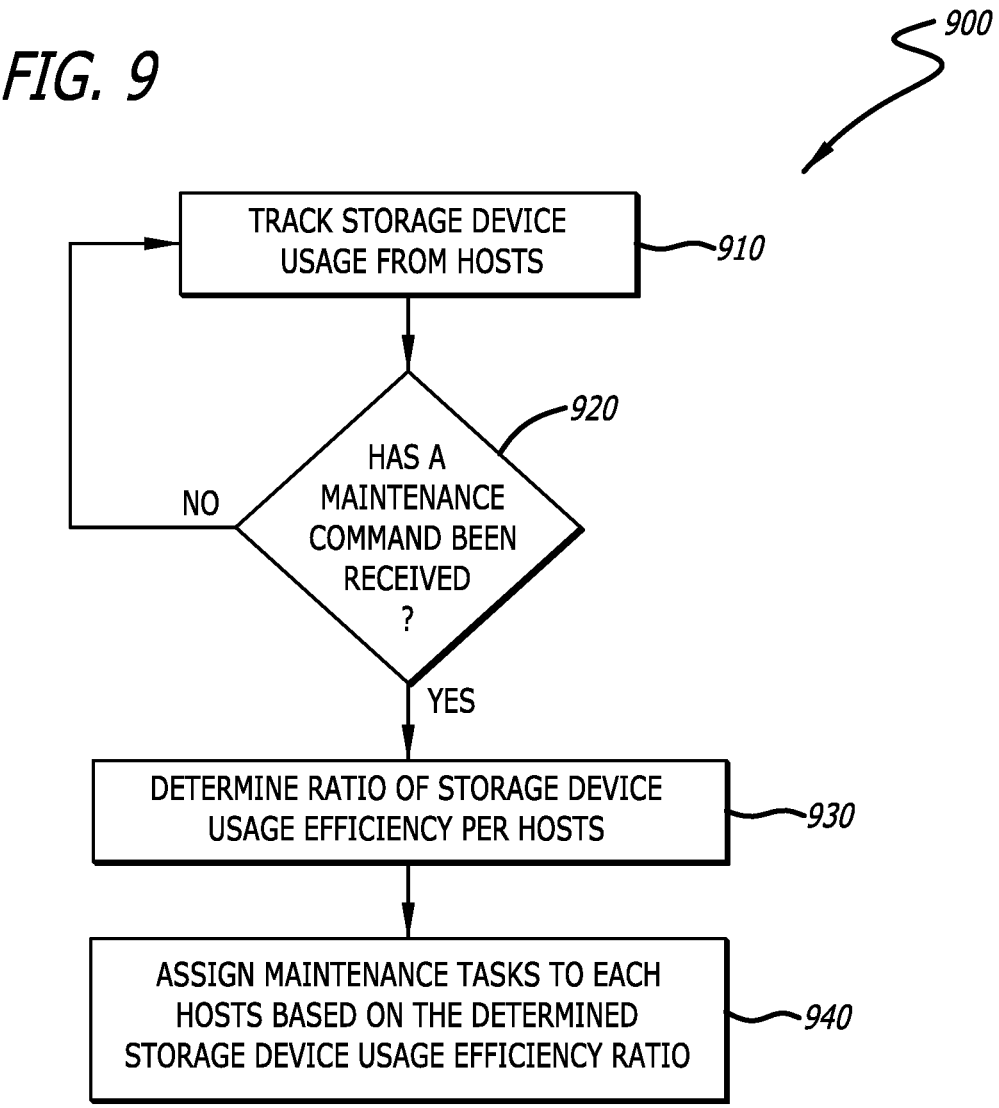
FIG. 9 is a flowchart depicting a process for assigning maintenance tasks to a plurality of hosts based on previously tracked storage device usage in accordance with an embodiment of the disclosure.

Referring to FIG. 9, a flowchart depicting a process 900 for assigning maintenance tasks to a plurality of hosts based on previously tracked storage device usage in accordance with an embodiment of the disclosure is shown. As discussed previously, many embodiments may potentially use aspects of the present disclosure to equitably distribute various tasks between hosts in relation to their culpability in requiring the task. For example, a host that writes many inefficient areas (i.e., streams) of data to a storage device is more at fault for necessitating a defragging process compared to another host that has remained dormant and/or has stored relatively more efficient data to the storage device. This process 900 can apply to any number of storage device maintenance tasks.

The process 900 can track storage device usage from the connected hosts (block 910). This can be similar to the process as described within FIG. 8. The storage device continues to operate normally while tracking until a maintenance command has been received (block 920). When a maintenance command has been received, the storage device can determine ratio data associated with the storage device usage efficiency per host (block 930). The methods of determining this ratio data are described in more detail above with reference to FIGS. 5-7. The ratio data can simply generate an overall level of culpability (i.e., responsibility) each host has for the required maintenance process being required. This ratio data can be used to assign maintenance tasks to each host based on their disk usage efficiency ratio (block 940).

As will be understood by those skilled in the art, the example described within FIG. 9 is one of many potential uses for the methods and systems described within this disclosure. Other embodiments may generate ratio data in other ways that can assign different attributes (other than disk usage efficiency). Assigned maintenance tasks can vary based on the storage device used. Similarly, "assigned" maintenance tasks may not be truly "assigned" to a host but may simply operate steps of the maintenance task during times that would otherwise be allocated to one or more hosts. Therefore, the performance of each host would be reduced in relation to their generated ratio data.

Figure 10:
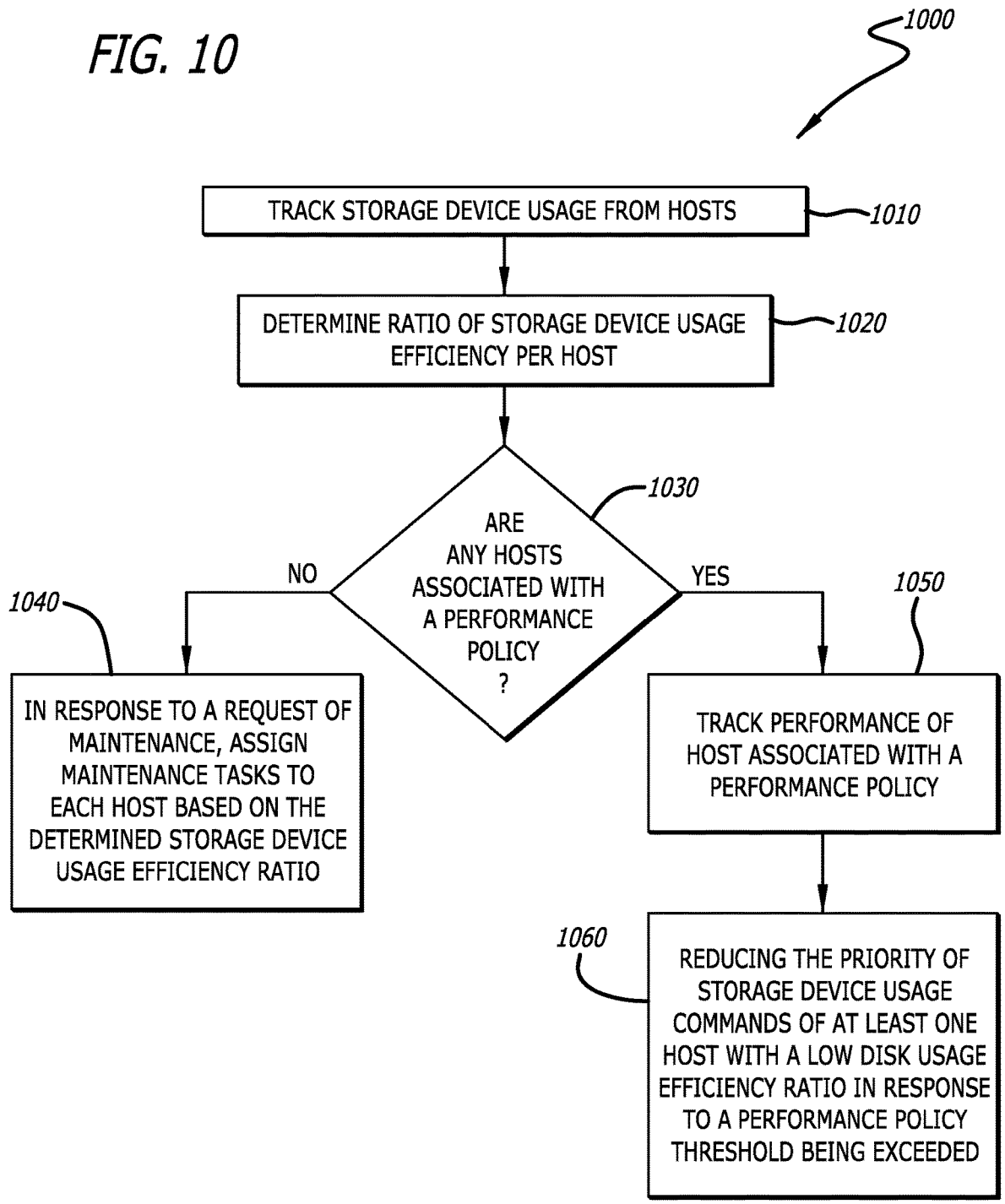
FIG. 10 is a flowchart depicting a process for upholding a performance policy by dynamically tracking and assigning tasks and/or reducing priorities in accordance with an embodiment of the disclosure.

Referring to FIG. 10, a flowchart depicting a process 1000 for upholding a performance policy by dynamically tracking and assigning tasks and/or reducing priorities in accordance with an embodiment of the disclosure is shown. Another application of the present disclosure is enforcement of performance policies within storage devices by equitably distributing tasks or dynamically distributing priorities between hosts. As before, the process 1000 can track storage device usage from virtual hosts (block 1010). This can again be similar to the process described in FIG. 8.

During operation, the storage device can determine the ratio of storage device usage efficiency per host (i.e., generate ratio data) at various points (block 1020). Often, this determination will be done in response to a received maintenance process command. In additional embodiments, the storage device may have an indication that one or more connected hosts are subject to one or more performance policies. In further embodiments, the process 1000 may determine if any hosts are associated with a performance policy in response to a ratio determination being completed (block 1030). In response to no hosts having performance policies, the storage device may continue to operate in response to subsequent maintenance requests as described in FIG. 9 (block 1040).

When one or more performance policies are in place with at least one host, the process 1000 can track the performance of the host subject to a performance policy (block 1050). As described above, performance policies may encompass many types of operations such as throughput, response time, read/write speed, etc. Each aspect under review due to a performance policy requirement can be analyzed and compared against a predetermined threshold, often established within the performance policy. When the performance-related threshold has been reached, the storage device may reduce the priority of received storage device usage commands of at least one host either not subject to a performance policy, or a host that will otherwise not be negatively impacted from a reduction in priority based on available historical data (block 1060). In this way, the process 1000 can dynamically adjust the priority and processing of hosts to maintain a performance policy that would otherwise be violated due to factors outside of that host's control.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A storage device, comprising:
   a processor;
   one or more communication channels suitable for connection with a plurality of host devices;
   a plurality of memory devices within a memory array;
   a plurality of controllers configured to receive device usage commands comprising one or more data write commands sent from the plurality of host devices; and
   resource tracking logic executed by the processor and configured to:
      track each received command and associate each received command to a sending host;
      track a data type and storage location associated with the one or more data write commands;
      wherein each data write command, data type, and storage location can be processed to generate a unique score corresponding to the projected maintenance needs associated with the respective data write command;
      generate a ratio based on the unique score associated with the one or more data write commands; and
      assign one or more tasks to each hosts' allocated processing time based on the generated ratio.

2. The storage device of claim 1, wherein the plurality of host devices are virtual host devices.

3. The storage device of claim 1, wherein the storage device is a Solid State Disk (SSD) storage device.

4. The storage device of claim 1, wherein the resource tracking logic tracks the received commands by generating internal log data.

5. The storage device of claim 1, wherein the one or more tasks are maintenance tasks.

6. The storage device of claim 5, wherein the one or more tasks are assigned based on projected maintenance needs in relation to other hosts' projected maintenance needs with the storage device.

7. The storage device of claim 1, wherein the association of the data write command is based on tracking the storage location.

8. The storage device of claim 7, wherein memory devices associated with the tracked data write commands are utilized by a single host.

9. The storage device of claim 1, wherein the resource tracking logic is further configured to track metadata with each write command.

10. The storage device of claim 9, wherein the tracked metadata can be associated with the sending host.

* * * * *